Feb. 14, 1928. 1,659,375
F. SCHMIDT
PROCESS FOR THE MANUFACTURE OF ARTIFICIAL SAUSAGE AND OTHER SKINS
Filed Nov. 30, 1926
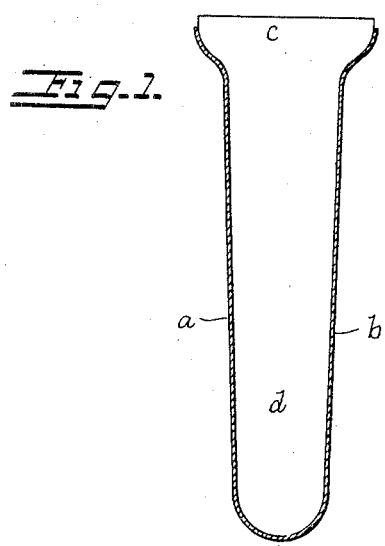
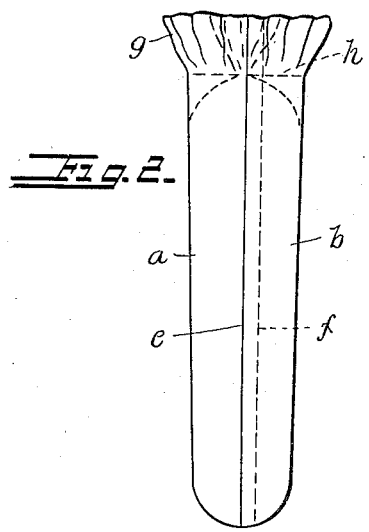
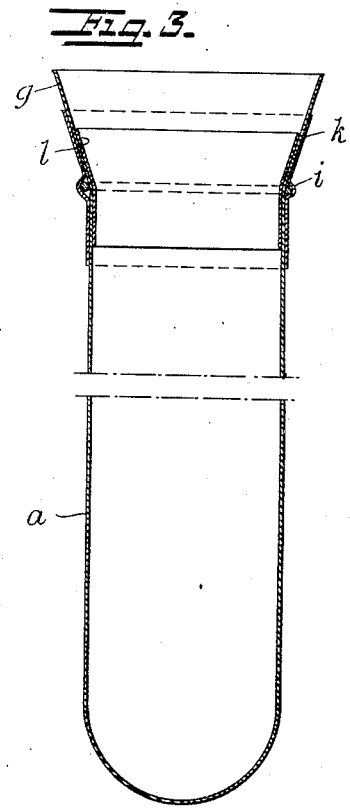
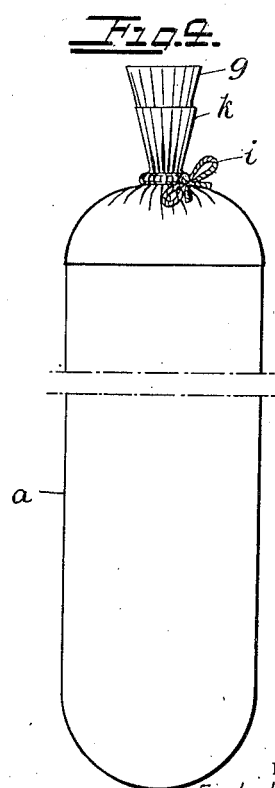
INVENTOR
Friedrich Schmidt
BY
his ATTORNEY Patented Feb. 14, 1928.

1,659,375

UNITED STATES PATENT OFFICE.

FRIEDRICH SCHMIDT, OF WURZBURG, GERMANY.

PROCESS FOR THE MANUFACTURE OF ARTIFICIAL SAUSAGE AND OTHER SKINS.

Application filed November 30, 1926, Serial No. 151,748, and in Germany November 25, 1925.

This invention relates to an improved process for the manufacture of artificial sausage casings.

According to the ordinary process of producing casings for sausage meats and other fillers, it has been found that beef gut is best suited for the purpose. This particular gut is known commercially, as middlegut, because of its inherent shape which is long, practically straight and of suitable uniform diameter. A similar condition is also found in dry calf bladders, but the very great demand for both of these types of casings is quite in excess of the supply and as a consequence the price demanded for them is exceedingly high. It follows, of course, that the manufacturers of sausages, etc., have more and more become compelled to resort to artificial forms of casings for their fillers and the most commonly known artificial casings are made from cheap gut of serpentine and straight shapes which is slit longitudinally in order that the same may be thoroughly dried in a stretched condition, a process by means of which the gut takes on the shape of strips. The casings are then manufactured by sewing the strips together. Likewise, the manufacture into sausage casings of artificial calf bladders, dry beef or hog-bladders as well as dry animal tissues require that they be first cut in a suitable manner and the edges sewed together to conform as nearly as practical to genuine calf bladders utilized as casings for sausages. The disadvantages of casings produced by the above process is that the coverings with the sausage filler will not withstand boiling in water; moreover the casing must be tied together at each end.

From the foregoing it will be clear that lack of toughness is a prominent disadvantage of ordinary artificial sausage casings. It is, therefore, the object of the present invention to provide an improved process of handling animal gut so as to preserve and increase its toughness to withstand the boiling steps to which the casing and contents are subjected.

I accomplish this object by means of the process hereinafter described and the steps of which are illustratively exemplified in the accompanying drawing, in which, Figure 1 is an elevational view of a core showing in section a gut strip stretched thereover.

Figure 2 is a side elevational view of a sausage skin, illustrating the connection between two parts thereof;

Figure 3 is a substantially cross sectional view of a casing in open condition; and Figure 4 is a side elevational view of the same in closed condition.

The steps of my process are as follows: Animal buts are selected and after being split open and freed from fat, etc., are treated with multivalent alcohols, for example glycerine or glycol with inorganic acids such as diluted muriatic acid, with organic acids, such as lactic acid for instance, or similar matter to swell the gut. The edges of the split gut to be connected together are overlapped and after treating with dilute or gaseous formaldehyde or any other chemical giving a similar effect the gut with its edges overlapping is finally dried. The sausage skins now ready to be filled are smoked which adds greatly to the toughness and resistance offered by the skin against disintegration by boiling.

For practicing the present process use is made of cheap parts of the bowels, guts or intestinal membranes which are cleaned of fat, slit open and treated with glycerine, and as illustrated in the drawings, the gut strips $a$ and $b$ which by reason of the treatment to which they have been subjected are adhesive and supple are drawn, as illustrated in Figure 1, wherein the gut is shown in section, upon suitably greased cores $d$ which enable the edges of the strips to be overlapped, the core being tapered very slightly toward one end. The opposite or free end of the core $d$ is provided with a bell shape extension $c$. The gut with its overlapped edges and the core $d$ are subjected to the effect of dilute or gaseous formaldehyde. The sausage skins which have thus been made durable are resistant to boiling and to water generally are then dried by an air current without being removed from the core and subsequently undergo a smoke treatment, after which the skins may be readily removed from the slightly tapered core which, as stated, were greased prior to the application of the gut thereto.

Figure 2 shows a ready made sausage skin or casing comprising two parts $a$ and $b$, the edges thereof, overlapping each other are designated $e$ and $f$. The upper end $g$ of the skin is bell shaped to correspond with the portion $c$ of the core $d$, the flared portion $g$ being provided to facilitate the filling operation. At the portion designated *h* in Figure 2, is the point at which the sausage is tied after the filling has been inserted as indicated in dotted lines in the said figure.

Sausage skins and casings of this character manufactured according to the present invention may be produced at a very low cost without sacrificing any of the qualities of the genuine high priced middle guts, and offer the additional advantage of only requiring a tie at one end since the other end is already closed because of the shape of the core.

The skins produced by this process will also withstand the action of water and boiling and as a consequence of the formaldehyde treatment of the skins are sterile the connection of the edges is exceedingly compact and secure. The use of the core *d* insures a slender straight shape for the skins so desirable for casings of this character.

The means for tying the sausages comprises preferably a gut string *i* which has been soaked in oil or similar matter and which is tied or attached through parts of the bowels and adhesively attached thereto according to the type of casing. The ends of the string *i* slip in the openings in the casing and are drawn together. The strings *i* are made preferably from parts of split bowels. To reenforce the neck of the casing additional pieces of bowels in the region of the string may be applied to the casing.

Figures 3 and 4 illustrate one embodiment of a sausage casing or skin produced according to the present invention. The neck of the skin *a* is provided on its outer side with a reenforcing piece or cover *k*, made from parts of the animal bowels, as already described and disposed so as to provide a pocket through which the string *i* is drawn. Further reenforcement for the neck of the casing is provided by affixing a second piece of skin *l* to the inner side of the skin *a*. In order to avoid a bulge where the string *i* is tied, the skins *k* and *l* are split at their ends. After the sausage filler has been inserted the string *i* is drawn and the neck of the skin closed, as illustratively exemplified in Figure 4.

What I claim is:

1. The herein described process of manufacturing sausage casings, consisting in removing the fat from slit animal intestines, subjecting the intestines to chemical treatment comprising a solution of multivalent alcohols to cause the intestines to swell, drawing the intestines over greased cores and overlapping the edges of the slit intestines to form tubular casings, placing strings about the open ends of the casing, then applying separate pieces of similarly treated intestines about the open ends of the casings and over the strings which are drawn for closing the open ends of the casings after filling same, and finally sterilizing and smoking the casings.

2. The herein described process of manufacturing sausage casings, consisting in removing the fat from slit animal intestines, subjecting the intestines to glycerine to render them adhesive and supple, drawing the intestines over greased cores and then overlapping the edges to form tubular casings, subjecting the casings and cores to the effects of formaldehyde to enable the casings to withstand the process of cooking, and finally sterilizing and smoking the casings subsequently to removal thereof from the cores.

3. The herein described process of manufacturing sausage casings from parts of animal intestines, which consists in freeing them from fat, treating the intestines to enable them to withstand boiling in water, pasting the treated intestines together at their edges to obtain the desired form, and thereafter disinfecting the intestines.

In testimony whereof I have hereunto affixed my signature.

FRIEDRICH SCHMIDT.